US012021891B2

(12) United States Patent
Davis et al.

(10) Patent No.: US 12,021,891 B2
(45) Date of Patent: Jun. 25, 2024

(54) SERVER CONNECTION RESETS BASED ON DOMAIN NAME SERVER (DNS) INFORMATION

(71) Applicant: HYAS Infosec Inc., Victoria (CA)

(72) Inventors: Christopher Michael Davis, Nanaimo (CA); Steven Mark Heyns, Nanaimo (CA); Paul Cornelius van Gool, Santa Barbara, CA (US)

(73) Assignee: HYAS Infosec Inc., Victoria (CA)

( * ) Notice: Subject to any disclaimer, the term of this patent is extended or adjusted under 35 U.S.C. 154(b) by 303 days.

(21) Appl. No.: 17/110,791

(22) Filed: Dec. 3, 2020

(65) Prior Publication Data

US 2022/0182353 A1 Jun. 9, 2022

(51) Int. Cl.
*H04L 9/40* (2022.01)
*H04L 61/4511* (2022.01)

(52) U.S. Cl.
CPC ...... *H04L 63/1441* (2013.01); *H04L 61/4511* (2022.05); *H04L 63/0236* (2013.01); *H04L 63/0263* (2013.01); *H04L 63/101* (2013.01); *H04L 63/1408* (2013.01)

(58) Field of Classification Search
CPC ............. H04L 61/1511; H04L 63/1408; H04L 63/0236; H04L 63/1441; H04L 63/0263; H04L 63/101; H04L 61/4511
See application file for complete search history.

(56) References Cited

U.S. PATENT DOCUMENTS

| 2011/0078309 | A1* | 3/2011 | Bloch | H04L 63/0236 709/224 |
| 2011/0197278 | A1* | 8/2011 | Chow | H04L 63/1416 726/24 |
| 2014/0380457 | A1* | 12/2014 | Cassell | H04L 63/1458 726/13 |
| 2017/0012988 | A1* | 1/2017 | Turgeman | H04L 63/102 |
| 2019/0268305 | A1* | 8/2019 | Xu | H04W 12/128 |

* cited by examiner

Primary Examiner — Gregory Todd (57) ABSTRACT

Systems, methods, and software described herein manage server connection resets based on domain name server (DNS) information. In one implementation, a firewall may receive a reverse DNS request from a computing system and communicate a request to a DNS security service to determine whether a destination associated with the reverse DNS request is malicious. The firewall further receives a response from the DNS security service that indicates that the destination is malicious and, when the response indicates that the destination is malicious, communicates a reset command to the destination to reset a connection between the destination and the computing system.

11 Claims, 7 Drawing Sheets

SERVER CONNECTION RESETS BASED ON DOMAIN NAME SERVER (DNS) INFORMATION

BACKGROUND

In computing environments, firewall services may be used to monitor incoming and outgoing network traffic to permit or block data packets based on security rules. In some examples, some firewall services may provide a Domain Name Server (DNS) resolver that is used to receive DNS requests from computing systems on a local network and provide the requesting computing system with a corresponding internet protocol (IP) address. The DNS resolver may further limit the IP addresses that are provided to a requesting computing system based on security threats or other rule limitations implemented by an administrator of the network.

In some examples, computing systems may maintain a cache of DNS associations, wherein the association may associate a Uniform Resource Locator (URL) with a corresponding IP address. However, because of the local association, the firewall for the network may not be able to perform security processes on a DNS lookup to prevent the connection to a malicious IP address. For example, malware on a user computing system may initiate an outgoing connection to an IP address that is associated with a malicious server or domain.

Overview

Provided herein are systems, methods, and software to manage server connection resets based on domain name server (DNS) information. In one implementation, a firewall receives a reverse DNS request from a computing system and, in response to the reverse DNS request, communicates a request to a DNS security service to determine whether an internet protocol (IP) address associated with the reverse DNS request is malicious. The firewall further receives a response from the DNS security service that indicates the IP address is malicious and communicates a reset command to a server associated with the IP address to reset a connection between the server and the computing system.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

DETAILED DESCRIPTION

Figure 1:
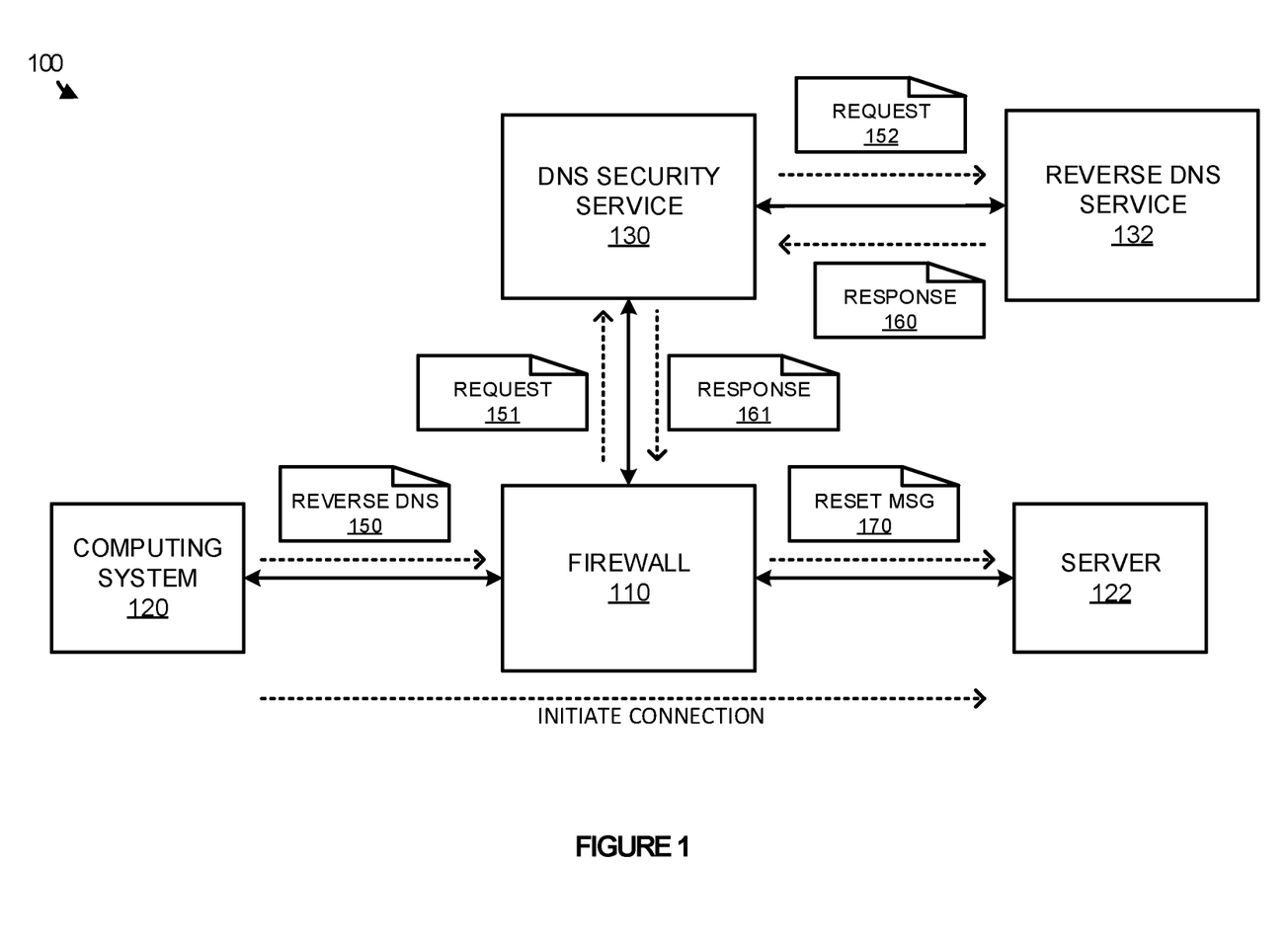
FIG. 1 illustrates a computing environment to manage server connections using Domain Name System (DNS) requests according to an implementation.

FIG. 1 illustrates a computing environment 100 to manage server connections using Domain Name System (DNS) requests according to an implementation. Computing environment 100 includes computing system 120, firewall 110, server 122, DNS security service 130, and reverse DNS service 132. Firewall 110 provides DNS resolver 121 that is used to resolve DNS queries from computing system 120. Computing environment 100 further includes reverse DNS request 150, requests, 151-152, responses 160-161, and reset message 170.

In operation, computing system 120 may include one or more applications to provide various operations for an end user, including web browsing, email, productivity, or some other operation. In some examples, computing system 120 may include a malicious application that can contact an external server to encrypt the data of the user (ransomware), retrieve personal data from the user, or provide some other malicious operation. The malicious application may include an association that is used to automatically direct the connection to an internet protocol (IP) address associated with a remote server without requiring a DNS lookup request to a DNS resolver. Accordingly, computing system 120 may initiate an outgoing connection request to server 122 through firewall 110 without using a DNS lookup to determine whether server 122 is possibly malicious.

In some examples, the operating system or an application executing on computing system 120 may perform a reverse DNS request even when the IP address is locally available on computing system 120. The reverse DNS request may provide information about server 122, such as an IP address used to communicate with server 122, to firewall 110. In particular, computing system 120, in addition to initiating the connection with server 122, communicate reverse DNS request 150 to firewall 110. In turn, firewall 110 may provide request 151 to DNS security service 130 to determine whether the reverse DNS request is associated with a malicious end server. Although demonstrated as separate from the firewall, it should be understood that DNS security service 130 may be implemented at least partially on the same computing system as firewall 110.

Once request 130 is received by DNS security service 130, DNS security service 130 may identify at least the IP address for server 122 in the request and may attempt to determine a URL associated with the IP address, the Name Server associated with the IP address (sometimes referred to as an authoritative name server), or some other attribute associated with the IP address. In some examples, the information associated with the IP address may be cached locally by DNS security service 130, however, in other implementations, DNS security service 130 may use request 152 to reverse DNS service 132 to determine the Name Server, URL, or other similar attribute associated with the IP address provided from computing system 120 (response 160 in FIG. 1). Once the one or more attributes are identified that are associated with the IP address, DNS security service 130 may determine whether the one or more attributes satisfy criteria to consider the destination of the communication malicious. The criteria may include one or more blacklists, whitelists, changes in Name Server as a function of time, or some other criteria. For example, from the identified Name Server, DNS security service 130 may determine whether server 122 is malicious based on a blacklist of potentially malicious Name Servers. This blacklist may be defined based on the location of the Name Servers, a corporation associated with the Name Server, or some other information about the Name Server.

After determining whether server 122 is malicious, DNS security service 130 provides response 161 to firewall 110 indicating whether server 122 is malicious. If not malicious, firewall 110 may continue to permit the connection between computing system 120 and server 122. However, if malicious, firewall 110 may communicate at least one reset message or RST packet from firewall 110 to server 122 to reset the connection between computing system 120 and server 122, limiting the communications between computing system 120 and server 122.

In some implementations, rather than waiting to determine if the IP address is malicious, firewall 110 may automatically communicate one or more reset messages to server 122 to reset the connection between computing system 120 and server 122. In addition to the automatic reset messages, firewall 110 may attempt to determine whether the IP address is malicious. If DNS security service 130 determines that the server is not malicious, then firewall 110 may stop resetting the connection. However, if DNS security service 130 determines that the server is malicious, then firewall 110 may continue using reset messages to prevent or limit the connection with computing system 120. Additionally, while demonstrated as occurring in firewall 110, it should be understood that DNS security service 130 or computing system 120 itself may communicate the one or more reset messages to server 122. For example, when computing system 120 identifies a reverse DNS request, computing system 120 may communicate one or more reset messages toward server 122 to reset the connection. Alternatively, because the reverse DNS request is provided to DNS security service 130, DNS security service 130 may automatically (or based on a maliciousness determination) communicate the reset messages to server 122 to reset the connection between server 122 and computing system 110. This may be accomplished by impersonating the connection for computing system 120.

Figure 2:
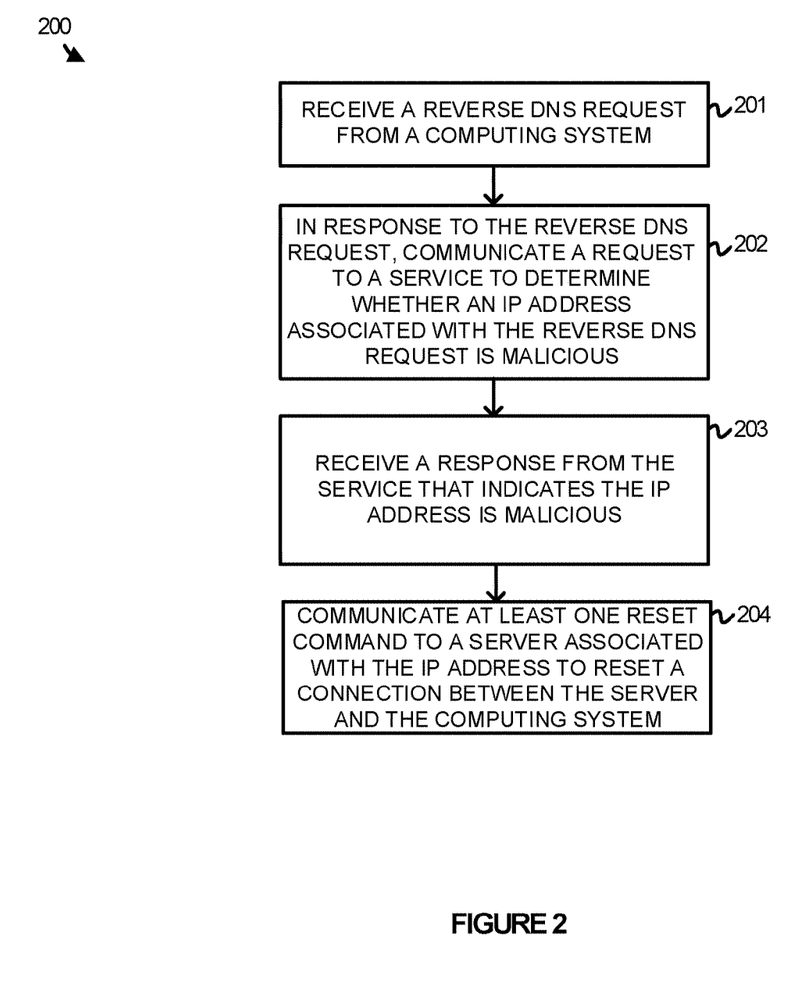
FIG. 2 illustrates an operation of a firewall to manage server connections using DNS requests according to an implementation.

FIG. 2 illustrates an operation 200 of a firewall to manage server connections using DNS requests according to an implementation. The steps of operation 200 are referenced parenthetically in the paragraphs that follow with reference to systems and elements of computing environment 100 of FIG. 1.

As depicted, operation 200 includes receiving (201) a reverse DNS request from a computing system on a local network. The reverse DNS request may include at least an IP address associated with a destination server for a connection from the computing system. As described herein, some applications may maintain a local IP address for a destination server, such that a URL request is not required to contact the destination server. For example, an application executing on computing system 120 may generate a request for a locally stored IP address. In addition to generating the connection request toward server 122 over firewall 110, computing system 120 may further provide a reverse DNS request to firewall 110, wherein the request may include the IP address used for the connection or some other information associated with server 122. In response to receiving the reverse DNS request, operation 200 further communicates (202) a request to a DNS security service to determine whether an internet protocol (IP) address associated with the reverse DNS request is malicious.

In some implementations, DNS security service 130 may maintain a cache that associates IP addresses with URLs and can further associate the IP address with a Name Server or authoritative name server, wherein the association may be used to determine if server 122 is malicious. In some examples, if the Name Server is on a blacklist, then DNS security service 130 may indicate to firewall 110 that the server is malicious. In other implementations, DNS security service 130 may determine that an IP address is malicious if the IP address or domain name associated with server 122 is on a blacklist. DNS security service 130 may then communicate a notification to the firewall indicating that server 122 is malicious based on the associations with the IP address. In other implementations, if DNS security service 130 does not include a cached result, then DNS security service 130 may generate a request to a reverse DNS service 132 to identify the information associated with reverse DNS request 150. In particular, request 152 may be used to obtain DNS information associated with the IP address from the reverse DNS request. Once the information is obtained, DNS security service 130 may determine whether the destination in the reverse DNS request is malicious by comparing the information to one or more criteria. The criteria may include one or more whitelists, blacklists, or some other criteria to indicate the destination of the communication from the computing system may be malicious. In some examples, DNS security service 130 may determine that a destination is malicious based on monitoring changes to the Name Server associated with the IP address, such as a change in the location of a Name Server.

Once a response is communicated by DNS security service 130, operation 200 receives (203) the response from the service that indicates whether the IP address is malicious. In examples where DNS security service 130 determines that the destination is not malicious, the communication may be permitted, allowing data to and from server 122 to be communicated over firewall 110. However, in examples where the response from DNS security service 130 indicates that the IP address associated with the server is malicious, firewall 110 may generate and communicate (204) at least one reset message to the destination server to reset a connection between the server and the computing system. As an example, DNS security service 130 may determine that server 122 is malicious based on the response from DNS security service 130. After communicating response 161, firewall 110 may communicate a reset message 170 to server 122 to reset the connection and limit communications between computing system 110 and server 122. In some examples, in the example of a transmission control protocol (TCP) connection, the message may comprise an RST message for server 122.

In some implementations, firewall 110 may cache information about the IP address indicating whether the IP address is malicious, a URL associated with the IP address, or some other information associated with the IP address. When a second DNS request is received that includes the same IP address, the firewall may act without sending the query to DNS security service 130.

Although demonstrated in the previous example as triggering the reset commands based on a determination that the IP address is malicious, it should be understood that the reset commands may be triggered anytime a reverse DNS request is identified. Firewall 110 may then determine if the connection is malicious and either permit or continue with the reset commands based on the determination. Moreover, while demonstrated in firewall 110, it should be understood that similar operations may be employed by computing system 120 or DNS security service 130 to communicate the reset command to server 122. As an example, when a reverse DNS lookup is received by firewall 110, the request may be forwarded to DNS security service 130. DNS security service 130 may, in turn, initiate an operation to reset the connection between computing system 120 and server 122. This reset command may be communicated server 122 by imitating that the reset packet was communicated from computing system 120 or firewall 110, wherein addressing, ports, or other information may be provided by firewall 110 to imitate that the packet was delivered from computing system 120.

Figure 3:
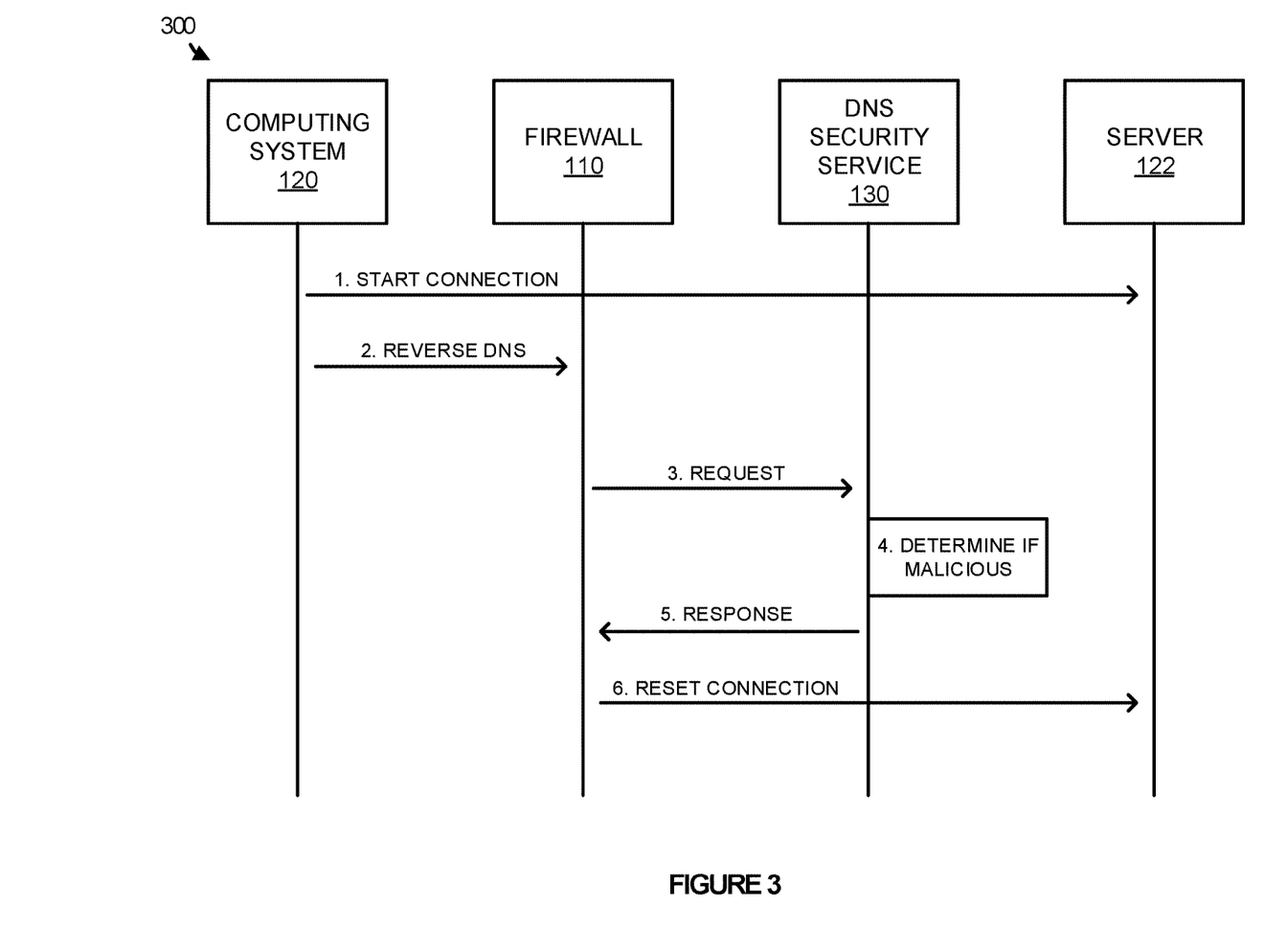
FIG. 3 illustrates a timing diagram for managing server connections using DNS requests according to an implementation.

FIG. 3 illustrates a timing diagram 300 for managing server connections using DNS requests according to an implementation. Timing diagram 300 includes computing system 120, firewall 110, DNS security service 130, and server 122 from FIG. 1. Other elements of computing environment 100 have been omitted for clarity.

In operation, computing system 120 executes an application that starts, at step 1, a connection with server 122 over firewall 110. The connection may comprise a transmission control protocol (TCP) connection, a user datagram protocol (UDP), or some other protocol connection between the computing system and the server. In addition to initiating the connection with server 122, computing system 120 further provides a reverse DNS request to firewall 110, at step 2. The reverse DNS request may be initiated by the operating system or another service executing on computing system 120 that, even if a local IP address is available for a communication by an application, performs an additional reverse DNS query to identify information associated with the IP address. When the query is received at firewall 110, firewall 110 may determine if a response to the reverse DNS query is cached at firewall 110. If cached, firewall 110 may directly determine whether the reverse DNS request is associated with a malicious destination (i.e., the URL/IP address/Name Server/etc. is associated with a malicious destination). In contrast, if not cached, firewall 110 may provide another request, at step 3, to DNS security service 130. DNS security service 130 may reside in a cloud service, another computing system on the same network, at least partially on firewall 110, or some other network destination. In response to the request, DNS security service 130 may determine, at step 4, if the reverse DNS request is associated with a malicious destination.

In some implementations, DNS security service 130 may maintain or cache associations between IP addresses, URLs, and Name Servers, wherein DNS security service 130 can use the cached associations to determine whether the destination is malicious by comparing the cached information to criteria. The criteria may include blacklists, whitelists, or some other criteria. In other implementations, DNS security service 130 may be required to obtain the domain name and/or Name Server information for the reverse DNS request from a reverse DNS service that can provide the required information to DNS security service 130. In response to receiving the response from the global service, DNS security service 130 may determine whether the destination computing element is malicious using the one or more criteria maintained by DNS security service 130.

After DNS security service 130 determines whether the reverse DNS request is associated with a malicious destination computing element, DNS security service 130 provides a response, at step 5, to firewall 110 indicating whether the destination is malicious. If the response indicates that server 122 is not malicious, firewall 110 may permit the connection and data packets to be communicated to and from computing system 120. In contrast, if the response indicates that the destination of the connection is malicious, DNS security service 130 may use reset messages on the connection to the server to reset the server connection. Advantageously, the reset messages may be used to prevent ingress and egress data in the connection between computing system 120 and server 122. The reset communication may be performed iteratively or at periodic intervals to ensure that the computing system is unable to efficiently connect to the server. In some implementations, a notification may also be generated that can be provided to an administrator of the network indicating the use of the application, the computing system associated with the connection, or some other information associated with the connection. The notification may be provided as an email, a text message, at a dashboard application for the administrator, or in some other manner that demonstrates an issue with the connection.

Figure 4:
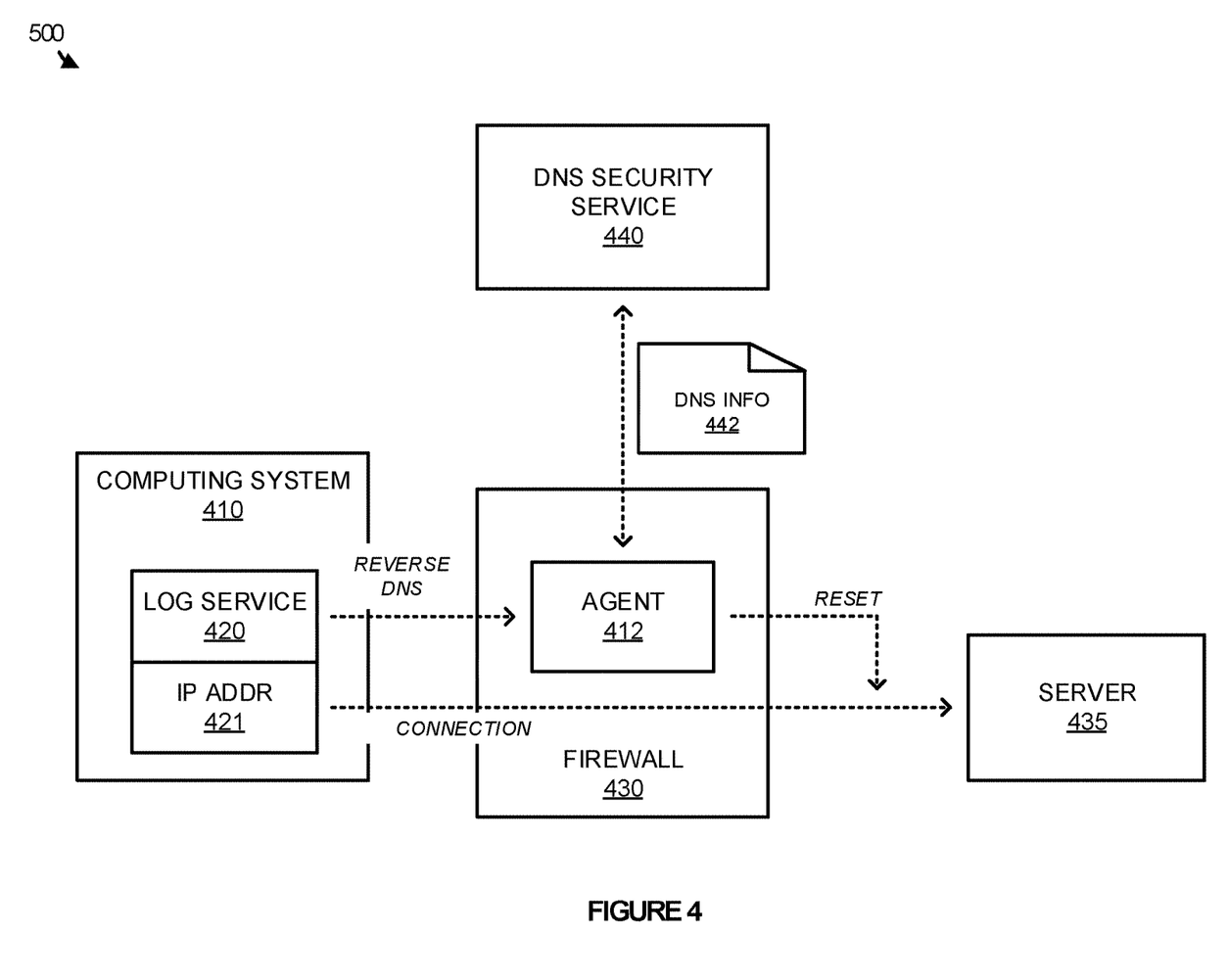
FIG. 4 illustrates an operational scenario of resetting a connection between a client computing system and a server according to an implementation.

FIG. 4 illustrates an operational scenario 400 of resetting a connection between a client computing system and a server according to an implementation. Operational scenario 00 includes computing system 410, firewall 430, DNS security service 440, and server 435. Computing system 410 further includes log service 420 and IP address 421, and firewall 430 further includes agent 412 that obtains DNS information 442 from DNS security service 440.

In operation, an application may generate a request to connect to a server external to a local computing network. To support the request, computing system 410 may use IP address 421 provided by the application to communicate with the server without a DNS request to a DNS resolver. Accordingly, computing system 410 may initiate a connection through firewall 430 to server 435 without requesting the IP address. In addition to initiating the connection, the operating system or a service executing on computing system 410 may generate a reverse DNS request to agent 412, wherein the reverse DNS request may include an IP address associated with the connection.

In response to receiving the reverse DNS request, agent 412 may provide a second request to DNS security service 440 to determine whether the destination for the communication from computing system 410 is malicious. The request may include the IP address as part of DNS information 440 permitting DNS security service 440 to obtain additional information associated with the IP address, such as the URL, the Name Server, or other similar attributes associated with the request. After the information is obtained by DNS security service 440 using one or more other servers as part of a reverse DNS service, DNS security service 440 may determine whether the destination associated with the IP address is malicious. In some examples, to determine whether the destination is malicious, DNS security service 440 may determine whether the Name Server, IP address, or domain name matches an entry in a whitelist or blacklist. For example, DNS security service 440 may obtain a record for the IP address that indicates the URL is on a Name Server that is on a malicious blacklist or is unknown to the DNS security service.

Once a determination is made about the destination, DNS security service 440 may communicate a notification to agent 412 indicating that the IP address associated with the reverse DNS request is malicious. After receiving the notification, firewall 430 may identify the connection from computing system 410 to server 435 and communicate a reset to server 435 to reset the connection between computing system 410 and server 435. The reset and any subsequent reset communications may be used to prevent ingress and egress packets from being communicated by computing system 410.

Although demonstrated as implementing the reset communications in firewall 430, it should be understood that the reset communications may be sent by computing system 410 or DNS security service 440 in response to identifying the reverse DNS request. Further, in some examples, rather than waiting for a determination of whether an IP address is malicious, computing system 410, firewall 430, or DNS security service 440 may communicate reset messages to server 435 in response to identifying the reverse DNS request. In some implementations, the reset messages may continue until a determination is made that the destination isn't malicious by DNS security service 440, wherein the reset messages may be stopped in response to the determination. As an example, DNS security service 440 may imitate the connection from computing system 410 to server 435 using IP addressing, port information, or other information provided to DNS security service 440 by agent 412. Thus, the DNS security service may communicate the reset without sitting in the communication path between computing system 410 and server 435.

Figure 5:
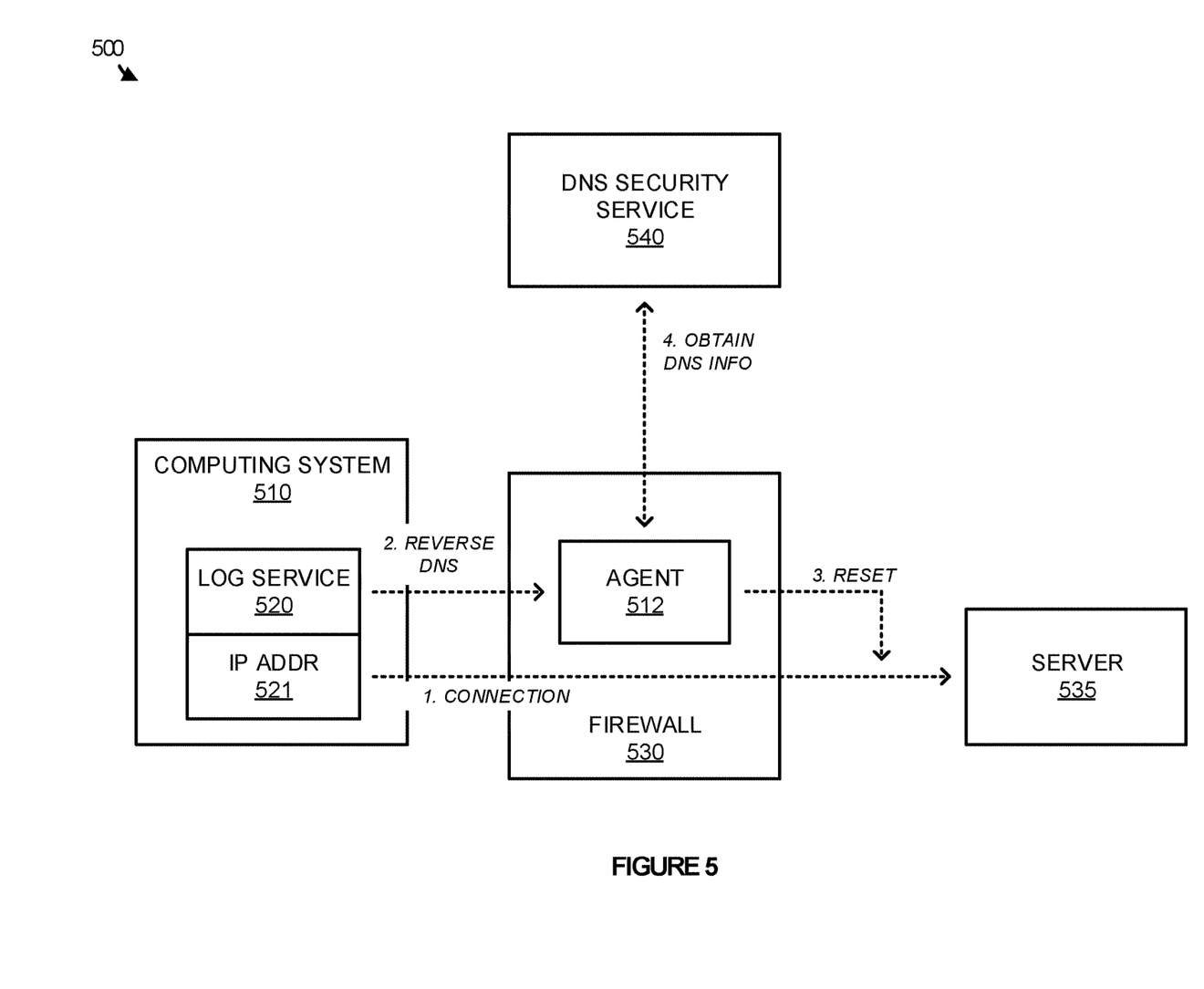
FIG. 5 illustrates an operational scenario of using reset messages based on reverse DNS requests according to an implementation.

FIG. 5 illustrates an operational scenario 500 of using reset messages based on reverse DNS requests according to an implementation. Operational scenario 500 includes computing system 510, firewall 530, server 535, and DNS security service 540. Computing system 510 further includes log service 520 and IP address 521, while firewall 530 further includes agent 512.

In operation, computing system 510 initiates, at step 1, a connection with server 535. In addition to initiating the connection, log service 520, which may represent the operating system or another service, communicates a reverse DNS request, at step 2, to firewall 512. Once received by firewall 530 and agent 512, agent 512 triggers a reset message to be communicated to server 535, at step 3. The reset message may comprise an RST packet in some examples that is used to reset a connection between computing system 510 and server 535.

In some implementations, in addition to automatically communicating the reset message to server 535, agent 512 may further communicate with DNS security service 540 to determine whether the IP address is malicious, at step 4. DNS security service 540 may make the determination based on the IP address, a domain name associated with the IP address, a Name Server associated with the IP address, or based on some other factor. Once it is determined whether the address is malicious, DNS security service 540 may communicate a notification to agent 512, permitting agent 512 to continue resetting the connection if the address is malicious or stop using the reset messages if the address is not malicious.

Although demonstrated in the example of operational 500 as resetting the connection at firewall 530, it should be understood that DNS security service 540 may be responsible for initiating the reset. In particular, DNS security service 540 may obtain the connection information for the connection between computing system 510 and server 535 and initiate a reset of the connection using the information. The reset may comprise the automatic reset and any resets determined if server 535 is malicious. The connection information may include IP addressing, port information, or other addressing information for the connection between computing system 510 and server 535.

Figure 6:
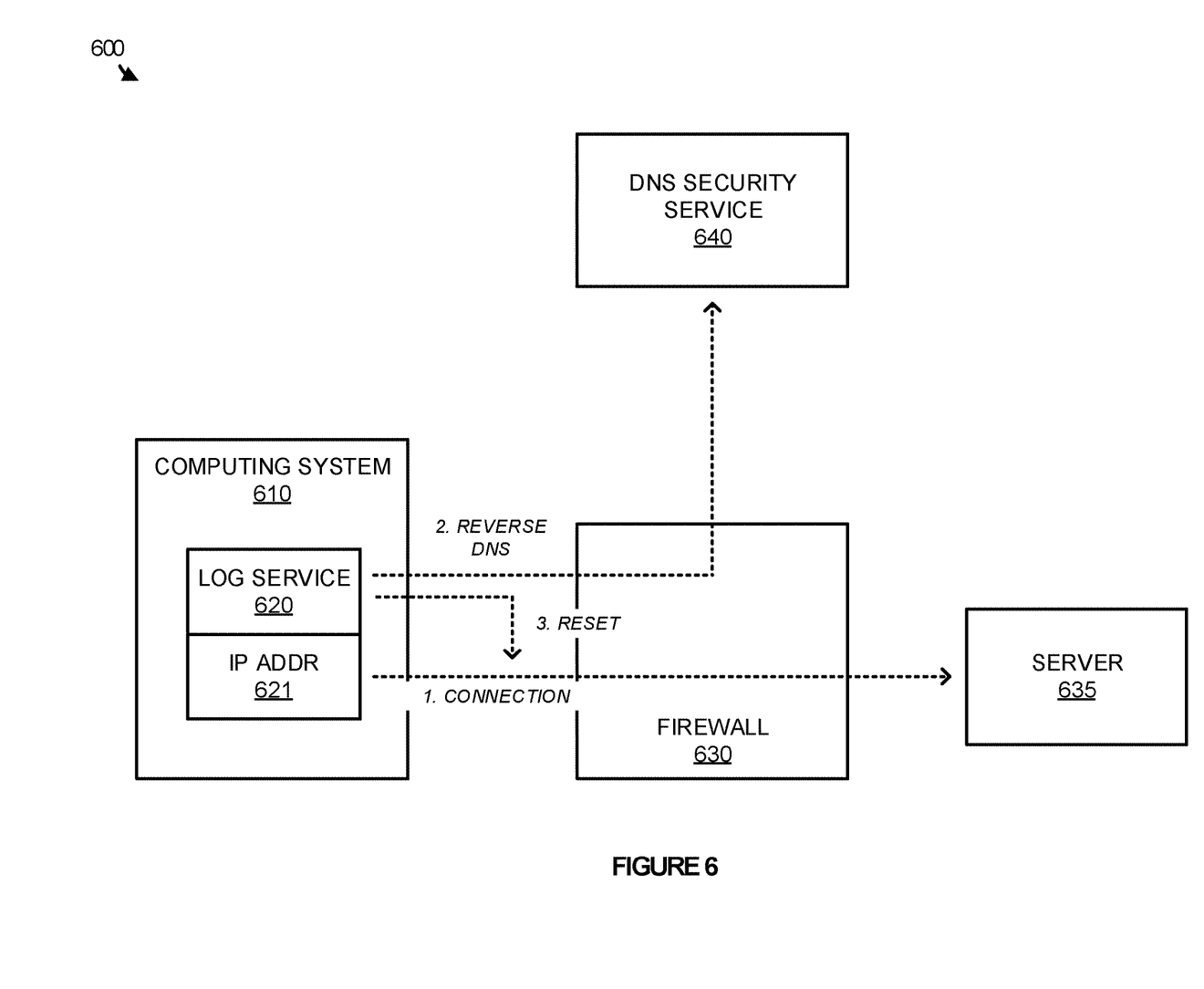
FIG. 6 illustrates an operational scenario of using reset messages based on reverse DNS requests according to an implementation.

FIG. 6 illustrates an operational scenario 600 of using reset messages based on reverse DNS requests according to an implementation. Operational scenario 600 includes computing system 610, firewall 630, server 635, and DNS security service 640. Computing system 610 further includes log service 620 and IP address 621.

In operation, computing system 610 initiates, at step 1, a connection using IP address 621, wherein IP address 621 may be programmed for an application on computing system 610. In response to initiating the connection and because the connection did not use a DNS request, log service 620 may initiate, at step 2, a reverse DNS request, wherein the reverse DNS request is used to determine a URL, a Name Server, or some other information associated with the IP address. Log server 620 may execute as part of the operating system of computing system 610 or as a standalone service. Once the reverse DNS request is identified, log service 620 may communicate reset messages, at step 3, to server 635, wherein the reset messages are used to reset the connection between computing system 610 and server 635.

In some implementations, DNS security service 640 may determine whether the IP address is malicious based on the IP address itself or on associations with a URL, a Name Server, or some other factor. DNS security service 640 may then return an indication of whether the IP address is malicious and may further provide information associated with the IP address, including the URL, domain name, Name Server, or some other information. Based on the notification, computing system 610 may continue to reset the connection or may permit the connection if DNS security service 640 indicates that the destination is not malicious.

Figure 7:
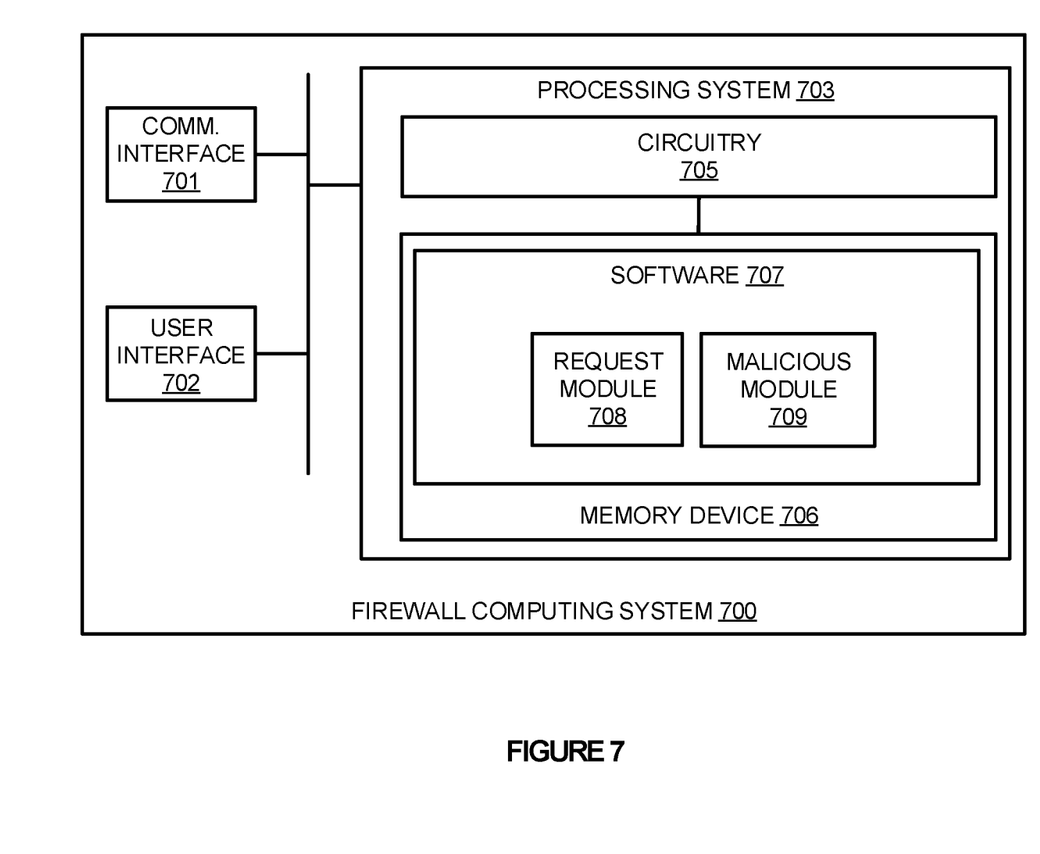
FIG. 7 illustrates a firewall computing system to manage server connections according to an implementation.

FIG. 7 illustrates a firewall computing system 700 to manage server connections according to an implementation. Computing system 700 is representative of any computing system or systems with which the various operational architectures, processes, scenarios, and sequences disclosed herein for a firewall may be implemented. Computing system 700 is an example firewall 110, although other examples may exist. Computing system 700 comprises communication interface 701, user interface 702, and processing system 703. Processing system 703 is linked to communication interface 701 and user interface 702. Processing system 703 includes processing circuitry 705 and memory device 706 that stores operating software 707. Computing system 700 may include other well-known components such as a battery and enclosure that are not shown for clarity.

Communication interface 701 comprises components that communicate over communication links, such as network cards, ports, radio frequency (RF), processing circuitry and software, or some other communication devices. Communication interface 701 may be configured to communicate over metallic, wireless, or optical links. Communication interface 701 may be configured to use Time Division Multiplex (TDM), Internet Protocol (IP), Ethernet, optical networking, wireless protocols, communication signaling, or some other communication format—including combinations thereof. In at least one implementation, communication interface 701 may communicate with one or more computing systems as part of a local network. Communication interface 701 may further be used to connect the one or more computing systems to computing elements, such as servers or clients, over the internet.

User interface 702 comprises components that interact with a user to receive user inputs and to present media and/or information. User interface 702 may include a speaker, microphone, buttons, lights, display screen, touch screen, touch pad, scroll wheel, communication port, or some other user input/output apparatus—including combinations thereof. User interface 702 may be omitted in some examples.

Processing circuitry 705 comprises microprocessor and other circuitry that retrieves and executes operating software 707 from memory device 706. Memory device 706 may include volatile and nonvolatile, removable and non-removable media implemented in any method or technology for storage of information, such as computer readable instructions, data structures, program modules, or other data. Memory device 706 may be implemented as a single storage device but may also be implemented across multiple storage devices or sub-systems. Memory device 706 may comprise additional elements, such as a controller to read operating software 707. Examples of storage media include random access memory, read only memory, magnetic disks, optical disks, and flash memory, as well as any combination or variation thereof, or any other type of storage media. In some implementations, the storage media may be a non-transitory storage media. In some instances, at least a portion of the storage media may be transitory. In no case is the storage media a propagated signal.

Processing circuitry 705 is typically mounted on a circuit board that may also hold memory device 706 and portions of communication interface 701 and user interface 702. Operating software 707 comprises computer programs, firmware, or some other form of machine-readable program instructions. Operating software 707 includes request module 708 and malicious module 709, although any number of software modules may provide a similar operation. Operating software 707 may further include an operating system, utilities, drivers, network interfaces, applications, or some other type of software. When executed by processing circuitry 705, operating software 707 directs processing system 703 to operate computing system 700 as described herein.

In one implementation, request module 708 directs processing system 703 to receive a DNS request from a computing system and forward a request to a DNS security service to determine whether a URL in the reverse DNS request is malicious. The DNS security service may be executed by a cloud service, on one or more local computing systems, or some other computing configuration. In some implementations, the DNS security service may obtain DNS information associated with the reverse DNS request, wherein the DNS information may include an IP address associated with the URL, a Name Server associated with the URL, or some other information. From the obtained information, the DNS security service may determine whether the IP address or destination could be malicious. In some examples, the DNS security service may determine whether the DNS information for the URL satisfies one or more criteria, wherein the one or more criteria may include one or more blacklists, whitelists, or some other criteria. In some implementations, the one or more criteria may reflect changes to the Name Server associated with the URL. For example, at a first time a URL may be associated with a first Name Server, while at a second time a URL may be associated with a second Name Server. The change in Name Server may indicate that the IP address is malicious and may further be reflected by the location of the Name Server, the time of the change of the Name Server, or some other factor. Once the DNS security service determines whether a destination associated with the URL is malicious, DNS security service 130 may provide a response to firewall computing system 700.

Malicious module 709 directs processing system 703 to receive the response from the DNS security service and, if the response indicates that the destination IP address associated with the URL is malicious, communicate a reset communication to the destination IP address to reset the connection between the server and the computing system that generated the reverse DNS request. For example, a computing system in a local network may maintain a local association between a URL and an IP address, permitting an application to directly contact the IP address without a DNS request. However, in addition to initiating the connection using the IP address, the computing system may provide a DNS request that is received by firewall computing system 700. In response to the request, firewall computing system 700 will determine whether the request is associated with a malicious destination IP address and disrupt the connection using reset messages, wherein the reset messages may be sent once, sent at periodic intervals, or sent at some other interval to interrupt communications between the computing system and the destination server.

In some implementations, prior to determining whether the IP address is malicious, firewall computing system 700 and request module 708 may automatically communicate the reset command or messages to the destination server. In particular, request module 708 may direct processing system 703 to identify a reverse DNS request for the computing system and, in response to the request, communicate the reset commands to the server without checking if the IP address is malicious. In some implementations, the computing system may then determine using the DNS Although demonstrated in the previous example using a firewall system to implement the reset commands or communications, it should be understood that other elements may implement the same or similar operations. For example, the computing system that initiates the reverse DNS request may also communicate resets for the connection until the reverse DNS request indicates that the connection is not malicious. Alternatively, the DNS security service may communicate the reset commands to the destination server based on the connection information (IP address, port, etc.) for the communication. The connection information may be obtained as part of the reverse DNS request from the firewall, permitting the DNS security service to send a reset packet as if the reset packet was communicated by the computing system. Each of the elements may communicate the reset commands to the destination server until a determination is made indicating whether the IP address is malicious.

Returning to the elements of FIG. 1, computing system 120, firewall 110, server 122, DNS security service 130, and reverse DNS service 132 may each comprise communication interfaces, network interfaces, processing systems, computer systems, microprocessors, storage systems, storage media, or some other processing devices or software systems and can be distributed among multiple devices. Examples of computing system 120, firewall 110, server 122, DNS security service 130, and reverse DNS service 132 can include software such as an operating system, logs, databases, utilities, drivers, networking software, and other software stored on a computer-readable medium. computing system 120, firewall 110, server 122, DNS security service 130, and reverse DNS service 132 may comprise, in some examples, one or more server computing systems, desktop computing systems, laptop computing systems, or any other computing system, including combinations thereof.

Communication between computing system 120, firewall 110, server 122, DNS security service 130, and reverse DNS service 132 may use metal, glass, optical, air, space, or some other material as the transport media. Communication between computing system 120, firewall 110, server 122, DNS security service 130, and reverse DNS service 132 may use various communication protocols, such as Time Division Multiplex (TDM), asynchronous transfer mode (ATM), Internet Protocol (IP), Ethernet, synchronous optical networking (SONET), hybrid fiber-coax (HFC), circuit-switched, communication signaling, wireless communications, or some other communication format, including combinations, improvements, or variations thereof. Communication between computing system 120, firewall 110, server 122, DNS security service 130, and reverse DNS service 132 may be a direct link or can include intermediate networks, systems, or devices, and can include a logical network link transported over multiple physical links.

The included descriptions and figures depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A computing apparatus:
    a storage system;
    a processing system operatively coupled to the storage system; and
    program instructions stored on the storage system that, when executed by the processing system, direct the computing apparatus:
        identify a reverse Domain Name System (DNS) request for a computing system, wherein the reverse DNS request comprises an internet protocol (IP) address associated with a server;
        in response to identifying the reverse DNS request;
            communicate a reset command at intervals to the server associated with the IP address to reset a connection between the server and the computing system; and
            determine whether the IP address is malicious;
        when the IP address is determined to be malicious, continue the communication of the reset command at intervals to the server; and
        when the IP address is determined to not be malicious, stop the communication of the reset command at intervals to the server.

2. The computing apparatus of claim 1, wherein identifying the reverse DNS request comprises receiving the reverse DNS request at a firewall.

3. The computing apparatus of claim 1, wherein determining that the IP address is malicious comprises determining that the IP address, a uniform resource locator associated with the IP address, or a Name Server associated with the IP address is on a blacklist.

4. The computing apparatus of claim 1, wherein determining that the IP address is malicious comprises querying a DNS security service to determine that the IP address is malicious.

5. The computing apparatus of claim 1, wherein the reset command comprises a reset packet.

6. A method of operating a firewall comprising:
    receiving a reverse Domain Name System (DNS) request from a computing system, wherein the reverse DNS request comprises an internet protocol (IP) address associated with a server;
    in response to identifying the reverse DNS request:
        communicating a reset command at intervals to the server associated with the IP address to reset a connection between the server and the computing system; and
        querying a DNS security service to determine whether the IP address is malicious;
    when the IP address is indicated to be malicious by the DNS security service, continuing the communication of the reset command at intervals to the server; and
    when the IP address is indicated not to be malicious by the DNS security service, stopping the communication of the reset command at intervals to the server.

7. The method of claim 6, wherein the reset command comprises a reset packet.

8. A method of operating a firewall comprising:
    identifying a reverse Domain Name System (DNS) request from a computing system, wherein the reverse DNS request comprises an internet protocol (IP) address associated with a server;
    in response to the reverse DNS request, communicating a reset command at intervals to the server associated with the IP address to reset a connection between the server and the computing system until a determination is made as to whether the IP address is malicious; and
    based on the determination indicating that the IP address is not malicious, stopping the communication of the reset command at intervals to the server.

9. The method of claim 8 further comprising:
    making the determination based on whether the IP address, the uniform resource locator associated with the IP address, or a Name Server associated with the IP address is on a blacklist.

10. The method of claim 8 further comprising:
    making the determination based on a query to a DNS security service that provides an indication of whether the IP address is malicious.

11. The method of claim 8, wherein the reset command comprises a reset packet.

* * * * *